United States Patent
Nishikawa et al.

(10) Patent No.: US 8,014,082 B2
(45) Date of Patent: Sep. 6, 2011

(54) LENS UNIT

(75) Inventors: Masayuki Nishikawa, Osaka (JP); Hideaki Fujita, Osaka (JP); Toshiharu Inui, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 94 days.

(21) Appl. No.: 12/448,514

(22) PCT Filed: Dec. 19, 2007

(86) PCT No.: PCT/JP2007/074397
§ 371 (c)(1),
(2), (4) Date: Jun. 22, 2009

(87) PCT Pub. No.: WO2008/075703
PCT Pub. Date: Jun. 26, 2008

(65) Prior Publication Data
US 2010/0067124 A1 Mar. 18, 2010

(30) Foreign Application Priority Data
Dec. 21, 2006 (JP) .................................. 2006-344206

(51) Int. Cl.
*G02B 9/00* (2006.01)
*G02B 15/14* (2006.01)
(52) U.S. Cl. ................... 359/738; 359/739; 359/694
(58) Field of Classification Search ............... 359/738, 359/739, 694, 704
See application file for complete search history.

(56) References Cited

U.S. PATENT DOCUMENTS

| | | | | |
|---|---|---|---|---|
| 5,079,577 | A | * | 1/1992 | Nomura .......................... 396/72 |
| 5,581,412 | A | * | 12/1996 | Tanaka ........................ 359/697 |
| 6,052,535 | A | * | 4/2000 | Uno .................................. 396/72 |
| 7,309,176 | B2 | * | 12/2007 | Shirakata et al. ............. 396/349 |
| 7,787,193 | B2 | * | 8/2010 | Sakamoto et al. ............ 359/696 |
| 2003/0184880 | A1 | | 10/2003 | Kawanabe |
| 2005/0168834 | A1 | | 8/2005 | Matsumoto et al. |
| 2005/0265710 | A1 | | 12/2005 | Shirakata et al. |

FOREIGN PATENT DOCUMENTS

| | | |
|---|---|---|
| JP | 63-180838 U | 11/1988 |
| JP | 5-036436 U | 5/1993 |
| JP | 07-110422 | 4/1995 |
| JP | 11-218657 A | 8/1999 |
| JP | 2004-004420 A | 1/2004 |
| JP | 2004-133054 A | 4/2004 |
| JP | 2005-301158 A | 10/2005 |
| JP | 2006-003458 | 1/2006 |

* cited by examiner

*Primary Examiner* — Jordan M. Schwartz
(74) *Attorney, Agent, or Firm* — Edwards Angell Palmer & Dodge LLP; David Conlin, Esq.; Catherine Toppin, Esq.

(57) ABSTRACT

One end of an FPC (21) for supplying power to the driving section of a light amount control section provided in a shutter unit (20) is disposed between a second lens holder (17) and the shutter unit (20) secured to this second lens holder (17) and is held between the second lens holder (17) and the shutter unit (20). Thus, the FPC (21) is prevented from being spaced apart from the shutter unit (20), and a member for securing the FPC (21) to the shutter unit (20) is eliminated, reducing the number of part items. Further, the second lens holder (17) and the shutter unit (20) blocks unwanted light toward the FPC (21), so that a ghost image is prevented from appearing on an image due to unwanted light reflected on the FPC (21).

14 Claims, 6 Drawing Sheets

LENS UNIT

CROSS-REFERENCE TO RELATED APPLICATIONS

This application is the National Stage of PCT/JP2007/074397, filed Dec. 19, 2007, which claims the benefit of Japanese Application 2006-344206, filed Dec. 21, 2006. The entire contents of each of these applications is incorporated herein by reference.

TECHNICAL FIELD

The present invention relates to a lens unit to be mounted on optical instruments such as cameras.

BACKGROUND ART

Conventionally, cameras and others including an image pickup optical system composed of plural lenses are in widespread use. In such a camera or the like, an image of a subject based on a light pencil incident on the image pickup optical system is formed on image sensors such as CCDs (Charge Coupled Devices) placed at specified positions. For such cameras, there is a desire for their further downsizing with a view to facilitating their incorporation into portable terminal equipment in addition to enhancements in zoom function, autofocus function or other higher functions and higher resolutions.

Furthermore, cameras having the zoom function are, in general, so designed that a zoom lens group and a shutter unit are integrally moved so as to provide a smaller aperture. That is, the shutter unit is secured on a subject side of the integrally driven lens group, with an FPC (Flexible Printed Circuit) provided for supplying power to the shutter unit. The FPC goes deformed with the moving lens group.

Among lens tubes equipped with such an FPC as shown above is one disclosed in JP 2006-3458 A (Patent Literature 1). An example of FPC placement and routing disclosed in Patent Literature 1 is shown in FIG. 7.

In FIG. 7, the FPC 1 is placed on an image pickup side of the shutter unit (not shown), and an L-shaped hooking holder 4 is integrally formed with an annular lid member 3 of a shutter holding frame 2 for routing of the FPC 1. Then, on a subject side of the FPC 1, a U-shaped portion 5 is formed by bending the FPC 1, and the U-shaped portion 5 is hooked to the hooking holder 4, with the FPC 1 drawn out on the image pickup side.

However, the conventional lens tube disclosed in Patent Literature 1 has the following problems. That is, since the shutter unit is placed more on the subject side than the lens group that is movably supported by the shutter holding frame 2, there arises a need for the annular lid member 3 to support the shutter unit on the shutter holding frame 2. Thus, members count increases as a problem.

Also, since the FPC 1 on the shutter unit side needs to be hooked to the hooking holder 4 provided in the annular lid member 3, the assembling work becomes more complex as another problem.

There is also a problem that since the FPC 1 undergoes an abrupt bending stress applied to the U-shaped portion 5 hooked to the hooking holder 4, disconnection may occur to conductive portions of the FPC 1.

SUMMARY OF INVENTION

Technical Problem

Accordingly, an object of the present invention is to provide a lens unit which allows the shutter unit to be driven along with the lens group and in which its optical system is not affected by routing of the FPC for supplying power to the shutter unit.

Solution to Problem

A lens unit according to the present invention includes:
a lens group arrayed in an optical-axis direction;
a lens holder on which the lens group is mounted and which is movable along a shaft parallel to the optical axis;
a shutter unit which is secured to the lens holder and which moves along with the lens holder;
a driving section which is mounted on the shutter unit and which drives a light amount control section provided on the shutter unit so that the light amount control section performs a light amount control operation; and
an interconnection which has flexibility and which supplies power to the driving section, wherein
one end, which is a driving section-side end, of the interconnection is placed between the lens holder and the shutter unit.

According to this invention, the driving-section side end of the interconnection for supplying power to the driving section of the light amount control section is held between the lens holder and the shutter unit, which is secured to the lens holder and which moves along with the lens holder. Therefore, the interconnection is prevented from being separated from the shutter unit, eliminating the need for any member for securing the interconnection to the shutter unit so that the parts count can be reduced.

Further, the one end of the interconnection is placed between the lens holder and the shutter unit. Therefore, unwanted light for the interconnection can be blocked by the lens holder and the shutter unit, so that formation of ghosts in images due to reflection of unwanted light by the interconnection is prevented.

In one embodiment, the interconnection is bent at an end portion of the shutter unit toward a subject side of the lens unit so as to extend toward the subject side, and is then curved halfway so as to extend toward an image pickup side of the lens unit, while an other end portion of the shutter unit opposite to the one end portion is secured to a side wall of a casing of the lens unit. Also, a power supply terminal of a position detection sensor for detecting a position of the lens holder is connected to an other end of the interconnection.

According to this embodiment, the interconnection undergoes no restraints during a process from when being bent toward the subject side until when being secured to the side wall of the casing. Therefore, unlike the case of the conventional lens tube disclosed in Patent Literature 1, no abrupt bending stress due to catching by the hooking holder is applied to the interconnection, so that the interconnection can be prevented from undergoing undue stress during movement of the lens holder. As a consequence, it becomes possible to form a conductor only on one side of the base material of the interconnection, which will lead to the reduction of the thickness of the interconnection.

Furthermore, connected to the other end of the interconnection is the power supply terminal of the position detection sensor. Therefore, there is no need for additionally providing any exclusive interconnection for supplying power to the position detection sensor, so that the parts count can be reduced.

In one embodiment, the interconnection is band-shaped and allows a position of the curvature to move along with movement of the lens holder and the shutter unit. And, in the interconnection, at least a width of a region over which the position of the curvature moves along with movement of the shutter unit is narrower than a width of the other end portion of the interconnection.

According to this embodiment, the width of the band-shaped interconnection in the region in which the interconnection is curved is narrower than the width of the other regions of the interconnection. Therefore, the force that the lens holder receives from the curved portion of the interconnection along with the movement of the lens holder is made smaller. As a consequence, it becomes possible to decrease changes of an angle of the interconnection with respect to the optical axis of the lens holder to lessen effects of curvature of the interconnection on the image quality.

In one embodiment, the interconnection is band-shaped, and the lens holder has a slit-like cutout near a position in which the interconnection is bent toward the subject side, and the interconnection is inserted into the cutout so that the interconnection is held by the lens holder.

According to this embodiment, the interconnection is held by the lens holder at a place where the interconnection is bent toward the subject side. Therefore, position and angle of the interconnection at which the interconnection is bent toward the subject side are prevented from varying along with movement of the lens holder and the shutter unit, so that the interconnection can be prevented from intruding to the optical path side.

In one embodiment, the cutout is defined by a body of the lens holder and a protruding portion of the lens holder that protrudes from a side face of the lens holder.

According to this embodiment, the interconnection, which is bent toward the subject side at the place of the cutout defined by the protruding portion of the lens holder and the body of the lens holder, is curved halfway so as to extend toward the image pickup side, passing outside the protruding portion, i.e., through between the protruding portion and the side wall of the casing, thus being secured to the side wall of the casing. Therefore, the protruding portion is enabled to move while thrusting out the interconnection to the side-wall side along with the lens holder. As a consequence, the interconnection can more effectively be prevented from intruding to the optical path side along with the movement of the lens holder and the shutter unit.

Advantageous Effects of Invention

As is apparent from the above, in the lens unit according to the present invention, because the one end of the interconnection for supplying power to the driving section of the light amount control section is disposed and held between the lens holder and the shutter unit, the interconnection is prevented from being separated from the shutter unit, which eliminates the need for any member for securing the interconnection to the shutter unit so that the parts count can be reduced.

Furthermore, the one end of the interconnection is placed between the lens holder and the shutter unit. Therefore, unwanted light directed to the interconnection is blocked by the lens holder and the shutter unit, so that formation of ghosts in images due to reflection of unwanted light by the interconnection is prevented.

If the interconnection is routed so as not undergo restraints during a process from when being bent toward the subject side until when being secured to the side wall of the casing, the interconnection is prevented from undergoing undue stress during movement of the lens holder.

When the width of the band-shaped interconnection in the region in which the interconnection is curved is narrower than the width of the other regions of the interconnection, the force that the lens holder receives from the curved portion of the interconnection along with the movement of the lens holder is made smaller. As a consequence, it becomes possible to decrease changes of an angle of the interconnection with respect to the optical axis of the lens holder to lessen effects of curvature of the interconnection on the image quality.

DESCRIPTION OF EMBODIMENTS

Figure 1:
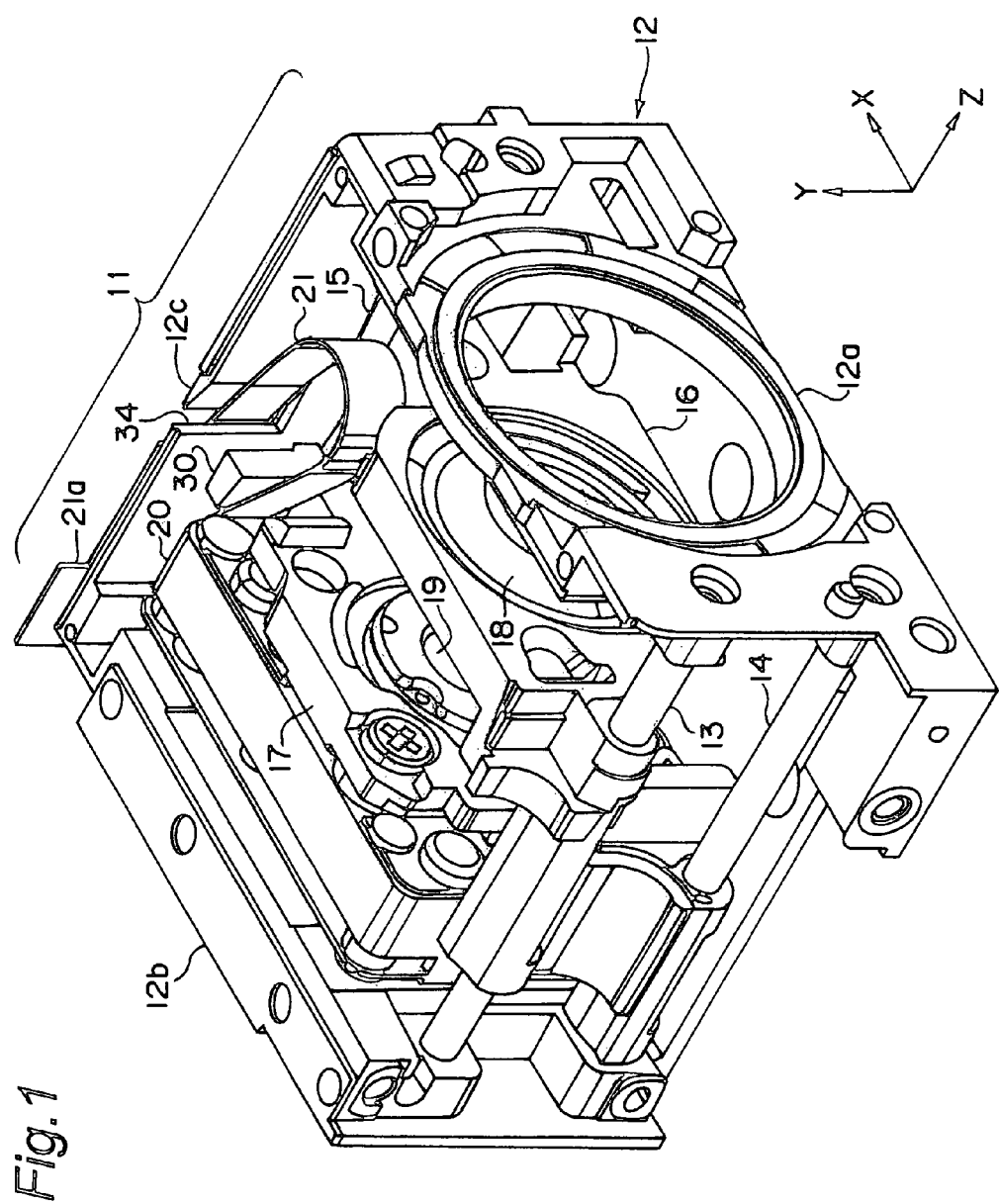
FIG. 1 is a perspective view showing a schematic construction of an optical unit on which a lens unit of the invention is mounted.
Figure 2:
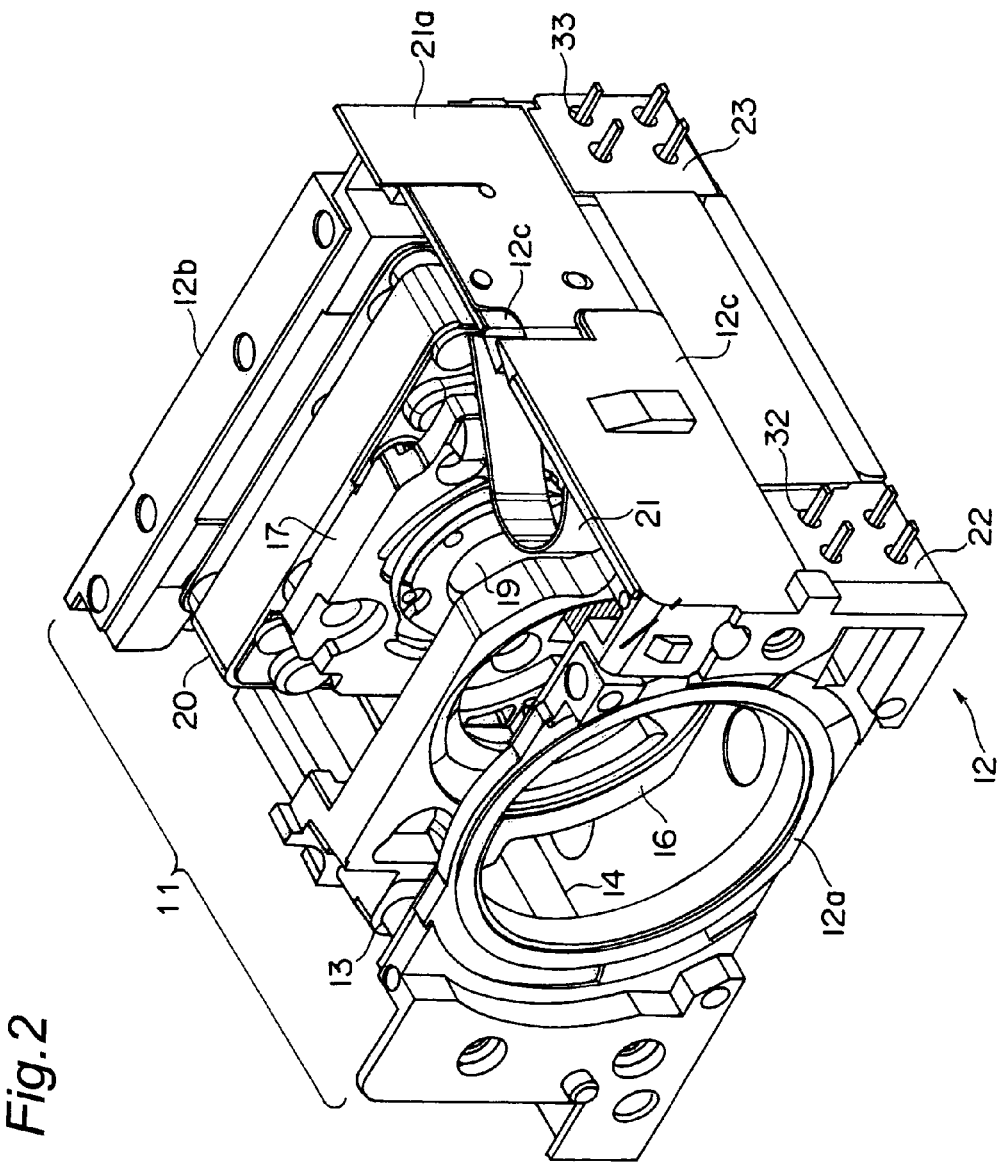
FIG. 2 is a perspective view of the optical unit shown in FIG. 1, as viewed in a direction different from that of FIG. 1.

Hereinbelow, the present invention will be described in detail by way of embodiments thereof illustrated in the accompanying drawings. FIGS. 1 and 2 are perspective views showing a schematic construction of an optical unit in which a lens unit of this embodiment is incorporated. In FIGS. 1 and 2, the optical unit 11 is formed in a generally rectangular-parallelepiped shape. Hereinbelow, a Z axis is set along an optical-axis direction while X and Y axes are set along two sides, respectively, of the rectangular parallelepiped of the optical unit 11 orthogonal to the optical axis.

The optical unit 11 is so constructed that optical components are mounted on an optical base 12 composed of a subject-side wall 12a, an image pickup-side wall 12b and a side wall 12c which is a Y-Z plane. Therefore, light coming incident from the subject-side wall 12a is thrown onto image sensors (not shown) provided on the image pickup-side wall 12b side.

Also in the optical unit 11, cylindrical guide shafts 13, 14, 15 are provided between the subject-side wall 12a and the image pickup-side wall 12b so as to be parallel to the Z axis and supported by the subject-side wall 12a and the image pickup-side wall 12b. Then, the guide shafts 13, 15 are inserted into a first lens holder 16, the first lens holder 16 being movable parallel to the Z axis along the guide shafts 13, 15. Similarly, the guide shafts 14, 15 are inserted into a second lens holder 17, the second lens holder 17 being movable parallel to the Z axis along the guide shafts 14, 15. It is noted that driving means for driving the first lens holder 16 and the second lens holder 17 in the Z-axis direction is not shown.

The first lens holder 16, on which a first lens group 18 is mounted, moves in the Z-axis direction to make focus adjustment. The second lens holder 17 has a second lens group 19 mounted thereon and a shutter unit 20 secured thereto on its image sensor side. An FPC 21 for supplying power to the shutter unit 20 has one end placed between a subject side of the shutter unit 20 and an image sensor side of the second lens holder 17. Then, the FPC 21 running out from between the shutter unit 20 and the second lens holder 17 extends from an end portion of the second lens holder 17 toward the subject, further being bent in an arc-shaping form toward the image sensor side, and set at an outside portion of the side wall 12c of the optical base 12. Further in the optical unit 11, as shown in FIG. 2, a first position detector 22 for detecting a position of the first lens holder 16 and a second position detector 23 for detecting a position of the second lens holder 17 are set up. Power supply to the first position detector 22 and the second position detector 23 is fulfilled by the FPC 21.

Figure 3:
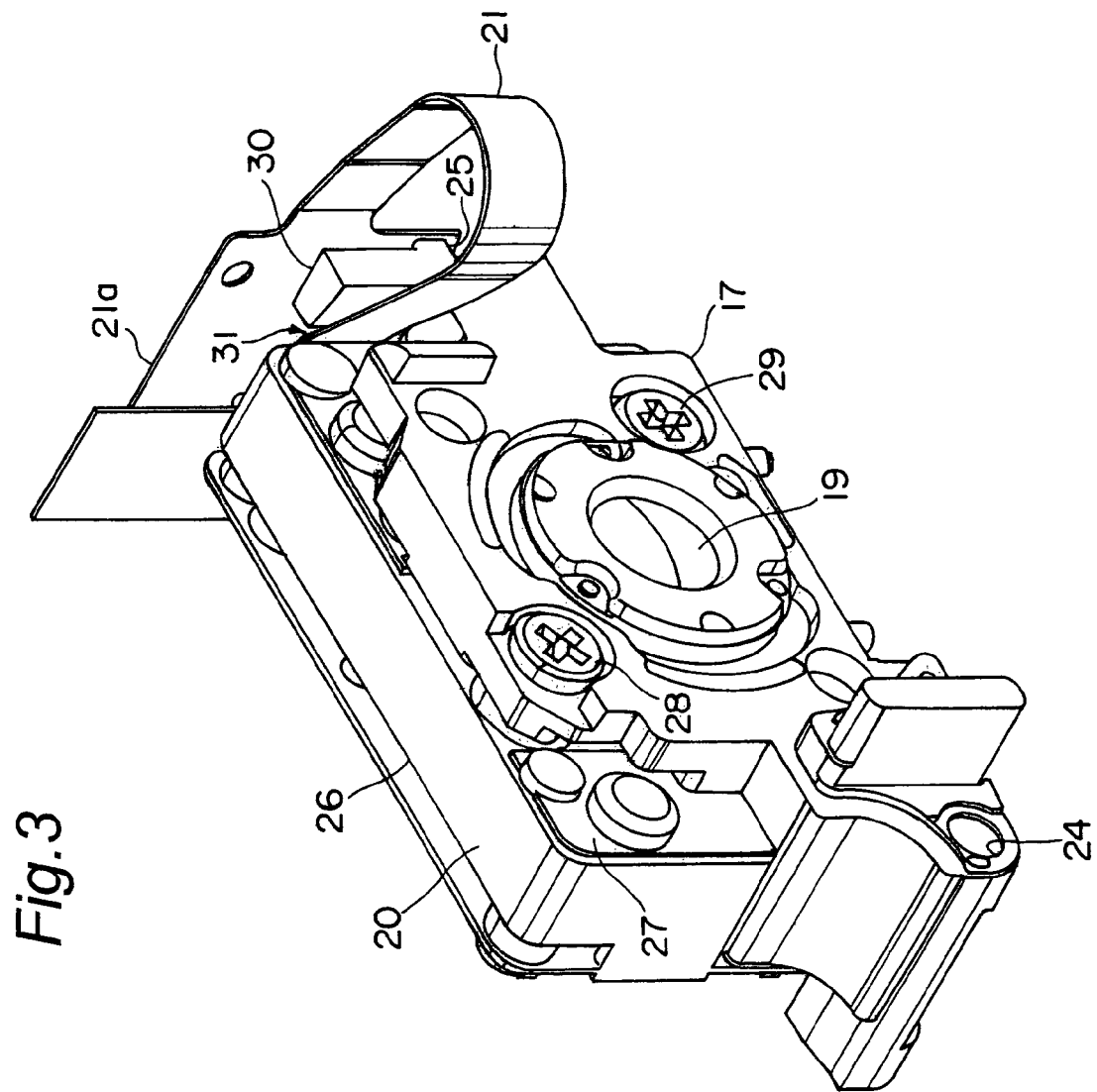
FIG. 3 is a view showing a second lens holder in FIG. 1 and members mounted thereon.

FIG. 3 shows the second lens holder 17 and members mounted on the second lens holder 17. A guide hole 24, which is a through hole, is formed in the second lens holder 17, and the guide shaft 14 is inserted into the guide hole 24. Also, an inverted U-shaped guide shaft receiver 25 is formed on a side wall 12c side of the optical base 12 opposite to the guide hole 24 side with the optical axis therebetween. The guide shaft 15 is inserted into the inverted U-shaped portion of the guide shaft receiver 25.

A light amount restricting section (not shown) for restricting light that goes incident on the image sensors is placed on a face 26 which is located on the image pickup side of the shutter unit 20 and which is vertical to the Z axis and parallel to the X-Y plane. On a face 27 of the shutter unit 20 which is located on the subject side of the shutter unit 20 and which is vertical to the Z axis and parallel to the X-Y plane, one end portion of the FPC 21 is placed along the face 27, and one end of the FPC 21 is soldered to the face 27 for supplying power to the driving section for the light amount restricting section. The FPC 21' has electroconductive members formed on only one surface of its base material, and the electroconductive members are formed on the subject side of the base material.

Fixation between the second lens holder 17 and the shutter unit 20 is done by screws 28, 29 tightened to the subject-side face 27 of the shutter unit 20 through the second lens holder 17. That is, the one end portion of the FPC 21 is placed between the second lens holder 17 and the shutter unit 20, and tightened by the screws 28, 29. Therefore, the FPC 21 can be prevented from being partly separated from the shutter unit 20. Further, unwanted light for the FPC 21 is blocked by the second lens holder 17 and the shutter unit 20. Therefore, it can be prevented that unwanted light impinges on the FPC 21 and is reflected therefrom to be a cause of ghosts in image pickup.

A protruding portion 30 is formed on an FPC 21-side end face of the second lens holder 17. The protruding portion 30 is provided so as to extend from an upper portion of the guide shaft receiver 25 of the second lens holder 17 to an upper side in the Y-axis direction, while a gap 31 is formed in the X-axis direction of the protruding portion 30. The FPC 21, which extends from the shutter unit 20, is inserted into the gap 31, and the FPC 21 is bent at a position of the gap 31 so as to be drawn out toward the subject side. Accordingly, the FPC 21 can be set up without being fixed to the second lens holder 17 with adhesive or double-sided tape or any fixing member or the like. Moreover, the gap 31 is positioned upper in the Y direction than the guide shaft receiver 25, thus facilitating guidance of the FPC 21 in assembling process, conveniently.

Figure 4:
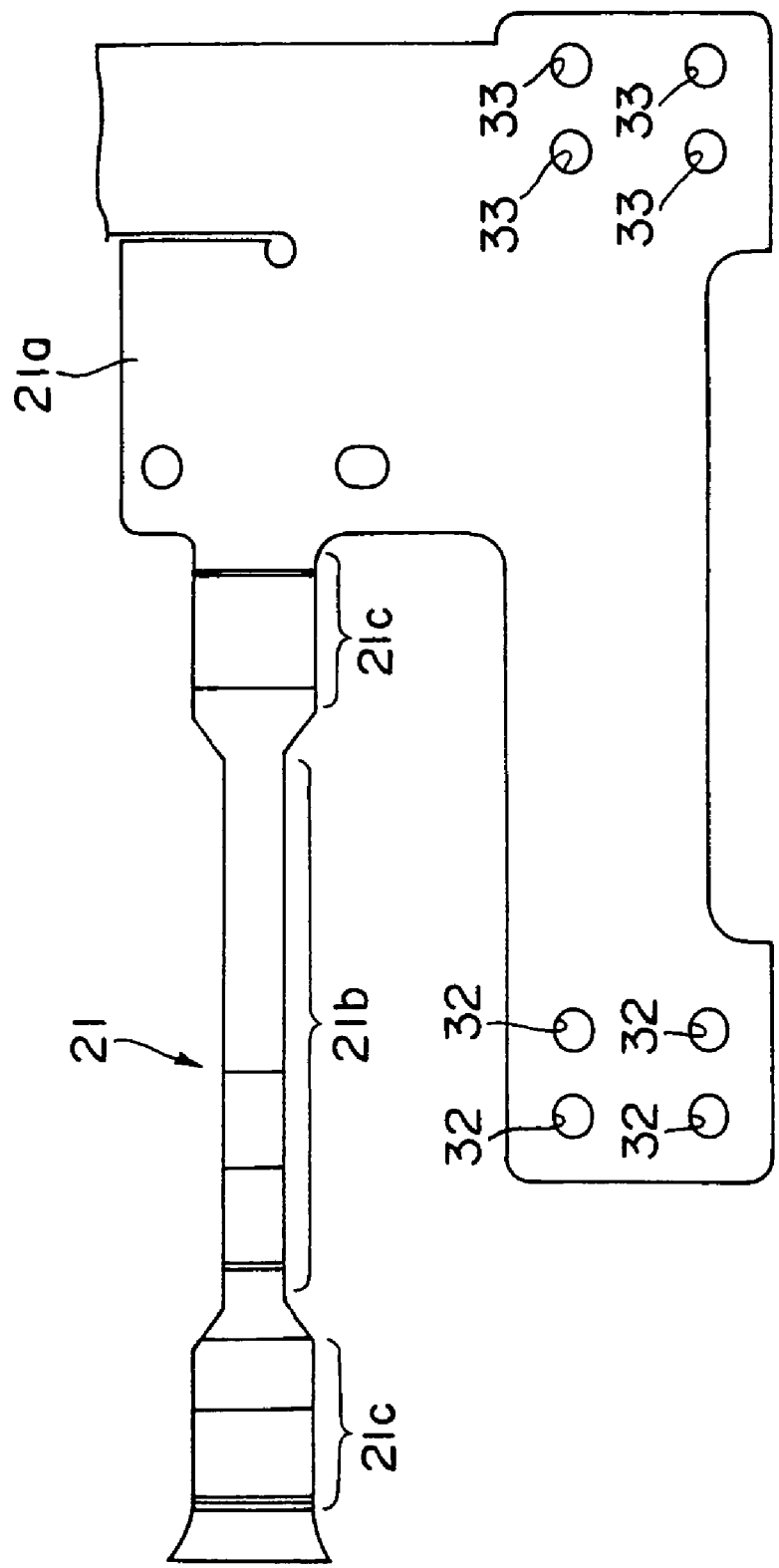
FIG. 4 is a developed view of the FPC in FIG. 1.

FIG. 4 shows a developed view of the FPC 21. Under a portion 21a of the FPC 21 that is placed outside the optical base 12 (hereinafter, the portion will be referred to as outer portion), four holes 32 are provided on the subject side, and four holes 33 are provided on the image pickup side. Into these holes 32 and holes 33, as shown in FIG. 2, metallic legs are inserted for conduction to the first position detector 22 and the second position detector 23, and the metallic legs are later electrically connected to the outer portion 21a of the FPC 21 by soldering or the like. Thus, it becomes possible to supply power to the first position detector 22 and the second position detector 23 by the FPC 21.

According to the routing of the FPC 21 as shown above, since electroconductive members are formed only on the subject-side surface of the base material of the FPC 21, it becomes possible to achieve a manufacturability and a cost cut of the FPC 21. Furthermore, since a portion 21b of the FPC 21 in which a curvature position of the FPC 21 moves along with movement of the second lens holder 17 and the shutter unit 20 can be made smaller in thickness, it becomes possible to smoothly move the second lens holder 17.

Since the portion 21b of the FPC 21 in which the curvature position moves is narrower in width than a portion 21c of the FPC 21 in which the curvature position does not move, it becomes possible to smoothly move the second lens holder 17 as in the foregoing case. Furthermore, since the portion 21b in which the curvature position moves is narrower in width than the portion 21c in which the curvature position does not move, a force that the second lens holder 17 receives from the curved portion of the FPC 21 along with the movement of the second lens holder 17 becomes smaller. Therefore, it becomes possible to decrease changes of an angle of the FPC 21 with respect to an optical axis of the second lens holder 17 to lessen effects of curvature of the FPC 21 on the image quality.

Figure 5:
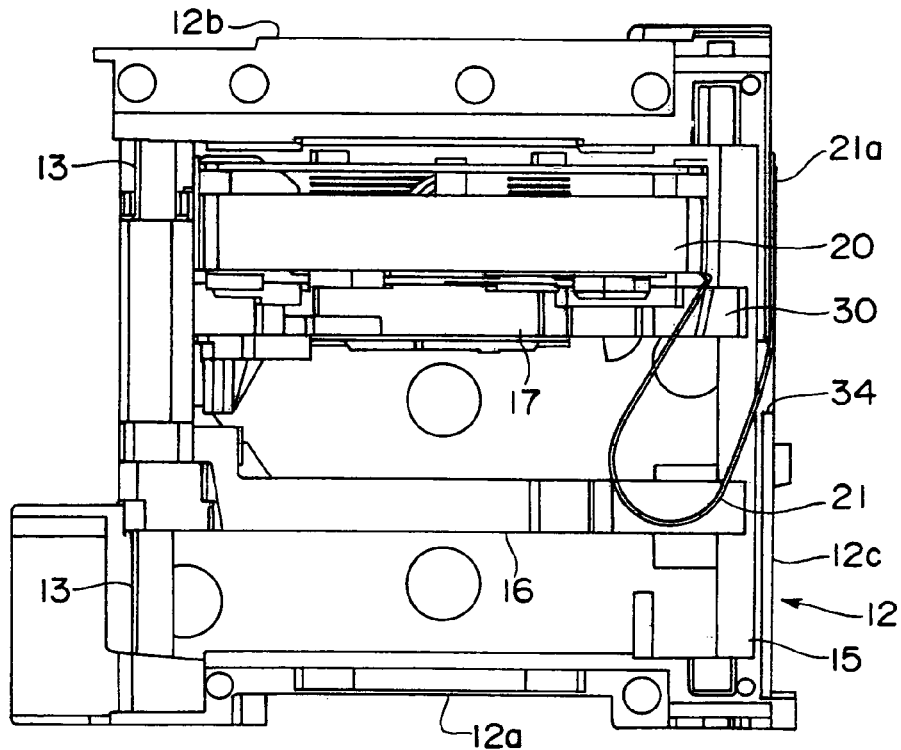
FIG. 5 is a plan view of the optical unit shown in FIG. 1, in which the second lens holder has moved most to an image sensor side.

FIG. 5 is a plan view of FIG. 1, showing a case in which the second lens holder 17 has moved most toward the image sensor side. A position of the first lens holder 16 in this state is as shown in FIG. 5. The FPC 21, which is drawn out from the shutter unit 20 so that its thicknesswise direction is along a direction in which the Z-X plane extends, passes through the gap 31 formed by the protruding portion 30 of the second lens holder 17, further being guided toward the subject side. Then, the FPC 21 is curved near the first lens holder 16 so as to be directed toward the image pickup side, coming out from a cutout 34 of the side wall 12c of the optical base 12.

Figure 6:
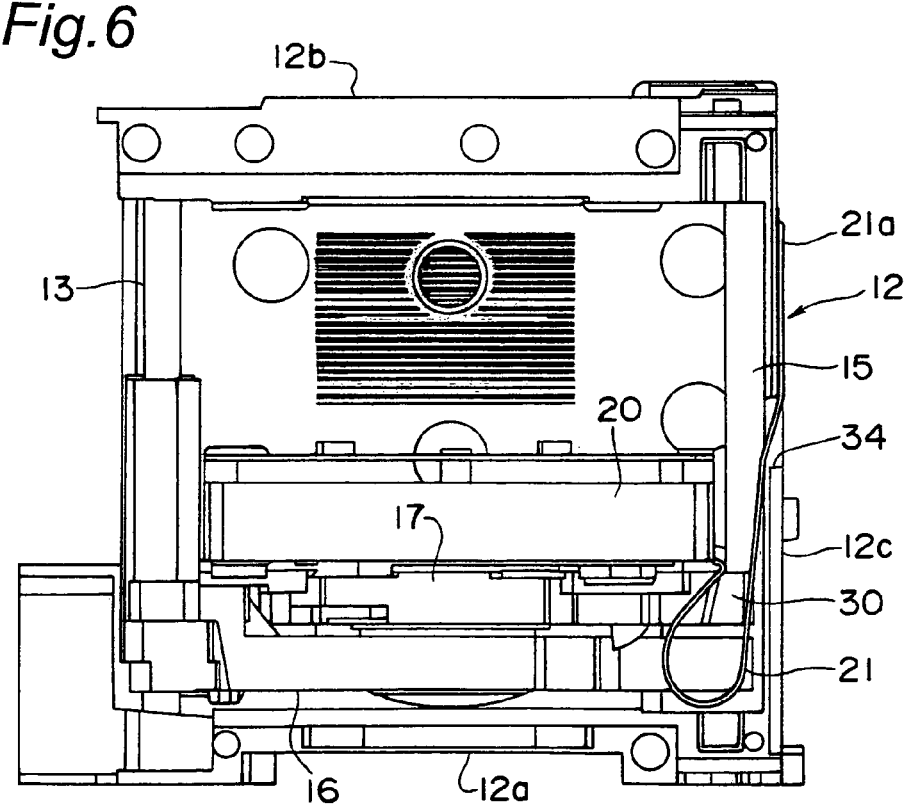
FIG. 6 is a plan view of the optical unit shown in FIG. 1, in which the second lens holder has moved most to a subject side.
Figure 7:
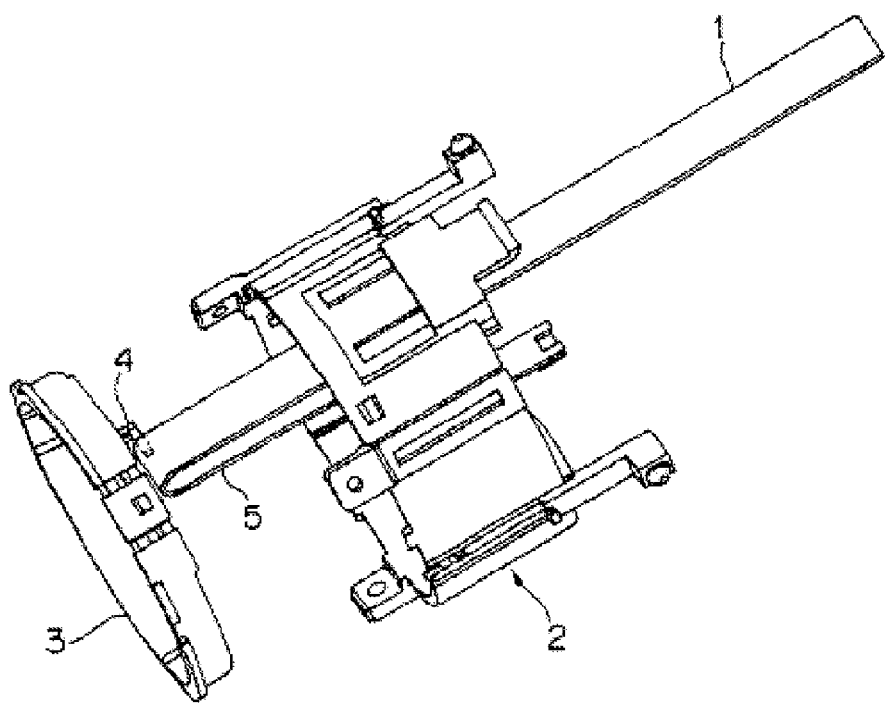
FIG. 7 is an explanatory view of the routing of a conventional FPC in the lens tube.

FIG. 6 shows a case in which the second lens holder 17 has moved most toward the subject side. The FPC 21 passes through the gap 31 of the protruding portion 30, and is curved at near the subject-side wall 12a of the optical base 12 so as to be directed toward the image pickup side and further guided to between the protruding portion 30 and the side wall 12c of the optical base 12, coming out from the cutout 34 of the side wall 12c of the optical base 12.

In this case, the protruding portion 30 is enabled to move along with the second lens holder 17 while the FPC 21 guided toward the image pickup side is kept pressed against the side wall 12c of the optical base 12. Therefore, it becomes possible to prevent the FPC 21 from being held between the first lens holder 16 and the second lens holder 17. It also becomes possible to prevent the occurrence that as the FPC 21 approaches the optical path, reflected light from the FPC 21 becomes ghosts in image pickup.

As described above, according to this embodiment, the FPC 21 for supplying power to the shutter unit 20 secured on the image pickup side of the second lens holder 17 has one end placed between the shutter unit 20 and the second lens holder 17 so as to be held by the second lens holder 17 and the shutter unit 20. Therefore, the FPC 21 can be prevented from being separated from the shutter unit 20, eliminating the need for a member for securing the FPC 21 to the shutter unit 20 so that the parts count can be reduced.

Furthermore, the one end of the FPC 21 is placed between the second lens holder 17 and the shutter unit 20. Therefore, unwanted light for the FPC 21 can be blocked by the second lens holder 17 and the shutter unit 20, so that formation of ghosts in images due to reflection of unwanted light by the FPC 21 can be prevented.

The FPC 21 undergoes no restraints during a process from when being bent toward the subject side at an end portion of the shutter unit 20 until when being secured to the side wall 12c of the optical base 12. Therefore, as in the case of the conventional lens tube disclosed in Patent Literature 1, no abrupt bending stress due to catching by the hooking holder is applied to the interconnection, so that the FPC 21 can be prevented from undergoing undue stress during movement of the second lens holder 17. As a consequence, it becomes possible to form the conductor only on one side of the base material of the FPC 21 to reduce its thickness.

Furthermore, to the other-side outer portion 21a of the FPC 21, power supply terminals of the first position detector 22 and the second position detector 23 are connected. Therefore, there is no need for additionally providing any exclusive FPC for supplying power to the first position detector 22 and the second position detector 23, so that the parts count can be reduced.

The band-shaped FPC 21 is so formed that its portion 21b in which the curvature of the FPC 21 moves is set narrower in width than its portion 21c in which the curvature does not move. Therefore, the force that the second lens holder 17 receives from the curvature portion of the FPC 21 along with the movement of the second lens holder 17 can be made smaller. As a consequence, changes of the angle of the FPC 21 to the optical axis of the second lens holder 17 can be decreased, so that effects of the curvature of the FPC 21 on the image quality can be reduced.

A portion of the FPC 21 at which the FPC 21 is bent toward the subject side is held by the gap 31 provided in the protruding portion 30 of the second lens holder 17. Therefore, position and angle of the FPC 21 at which the FPC 21 is bent toward the subject side never vary along with movement of the second lens holder 17 and the shutter unit 20, so that the FPC 21 can be prevented from intruding to the optical path side.

The FPC 21, which is bent toward the subject side at the place of the gap 31 provided in the protruding portion 30, is curved halfway so as to extend toward the image pickup side, passing outside the protruding portion 30, i.e., through between the protruding portion 30 and the side wall 12c of the optical base 12, thus being fitted and secured to the side wall 12c. Therefore, the protruding portion 30 is enabled to move while thrusting out the FPC to the side wall 12c side along with the second lens holder 17. As a consequence, the FPC 21 can more effectively be prevented from intruding to the optical path side along with the movement of the second lens holder 17 and the shutter unit 20.

The invention claimed is:

1. A lens unit comprising:
a lens group arrayed in an optical-axis direction;
a lens holder on which the lens group is mounted and which is movable along a shaft parallel to the optical axis;
a shutter unit which is secured to the lens holder and which moves along with the lens holder;
a driving section which is mounted on the shutter unit and which drives a light amount control section provided on the shutter unit so that the light amount control section performs a light amount control operation; and
an interconnection which has flexibility and which supplies power to the driving section, wherein a first end portion of the interconnection, which is a driving section-side end, is placed between the lens holder and the shutter unit,
wherein the interconnection is bent, in proximity to the first end portion at an end portion of the shutter unit, toward a subject side of the lens unit so as to extend toward the subject side, and is then curved halfway so as to extend toward an image pickup side of the lens unit.

2. The lens unit as claimed in claim 1, wherein a second end portion of the interconnection opposite to the first end portion is secured to a side wall of a casing of the lens unit, and a power supply terminal of a position detection sensor for detecting a position of the lens holder is connected to the second end portion of the interconnection.

3. The lens unit as claimed in claim 2, wherein the interconnection is band-shaped having a curvature and allows a position of the curvature to move along with movement of the lens holder and the shutter unit, and in the interconnection, at least a width of a region over which the position of the curvature moves along with movement of the shutter unit is narrower than a width of the second end portion of the interconnection.

4. The lens unit as claimed in claim 2, wherein the interconnection is band-shaped, and the lens holder has a slit-like cutout near a position in which the interconnection is bent toward the subject side, and the interconnection is inserted into the cutout so that the interconnection is held by the lens holder.

5. The lens unit as claimed in claim 4, wherein the cutout is defined by a body of the lens holder and a protruding portion of the lens holder that protrudes from a side face of the lens holder.

6. A lens unit comprising:
a lens group arrayed in an optical-axis direction;
a lens holder on which the lens group is mounted and which is movable along a shaft parallel to the optical axis;
a shutter unit which is secured to the lens holder and which moves along with the lens holder;
a driving section which is mounted on the shutter unit and which drives a light amount control section provided on the shutter unit so that the light amount control section performs a light amount control operation; and
an interconnection which has flexibility and which supplies power to the driving section, wherein the lens holder is located on a subject side of the shutter unit,
the interconnection is band-shaped and bent, at an end portion of the shutter unit, toward the subject side, and
the lens holder has a slit-like cutout near a position in which the interconnection is bent toward the subject side, and the interconnection is passed through the cutout so that the interconnection is held.

7. The lens unit as claimed in claim 6, wherein the cutout comprises a gap defined between a body of the lens holder and a protruding portion that protrudes from a side surface of the lens holder and extends in a direction perpendicular to the optical-axis direction and then in a direction parallel to a direction in which a wall of a casing of the lens unit extends.

8. The lens unit as claimed in claim 7, wherein when the lens holder moves towards the subject side, the protruding portion moves pushing the interconnection toward the wall of the casing.

9. The lens unit as claimed in claim 6, wherein the interconnection is bent in proximity to a first end portion thereof, then extends toward the subject side, and is then curved halfway so as to extend toward an image pickup side of the lens unit, while a second end portion of the interconnection opposite to the first end portion passes through a cutout in the side wall of the casing of the lens unit and is secured to an outside surface of the side wall of the casing.

10. The lens unit as claimed in claim 9, wherein the second end portion of the interconnection is secured to the outside surface of the side wall having the cutout of the casing through connection of the second end portion with a power supply terminal of a position detection sensor for detecting a position of the lens holder.

11. The lens unit as claimed in claim 10, wherein the interconnection includes a base material and an electroconductive material, which is provided only on a subject-side surface of the base material.

12. A lens unit comprising:
a lens group arrayed in an optical-axis direction;
a lens holder on which the lens group is mounted and which is movable along a shaft parallel to the optical axis;
a shutter unit which is secured to the lens holder and which moves along with the lens holder;
a driving section which is mounted on the shutter unit and which drives a light amount control section provided on the shutter unit so that the light amount control section performs a light amount control operation; and
an interconnection which has flexibility and which supplies power to the driving section, wherein
the lens holder is located on a subject side of the shutter unit,
the interconnection is band-shaped and has a first end portion that is held between the shutter unit and the lens holder, and a second end portion that passes through a first cutout provided in a side wall of a casing of the lens unit, the interconnection being bent, at an end portion of the shutter unit, toward the subject side,
the lens holder has a slit-like second cutout near a position in which the interconnection is bent toward the subject side, and the interconnection is passed through the second cutout so that the interconnection is held,
the lens holder is provided with a generally L-shaped protruding portion which has a bottom portion extending from a part of a side surface of the lens holder in a direction perpendicular to the optical axis and an erected portion extending upwards from the bottom portion, with a side surface of the erected portion opposed to the side surface of the lens holder, and the second cutout is defined between the opposed side surfaces of the erected portion and the lens holder.

13. The lens unit as claimed in claim 12, wherein the interconnection bent at the end portion of the shutter unit extends toward the subject side and is then curved halfway so as to extend toward an image pickup side of the lens unit.

14. The lens unit as claimed in claim 13, wherein
the second end portion of the interconnection is secured to an outside surface of the side wall having the first cutout of the casing through connection of the second end portion with a power supply terminal of a position detection sensor for detecting a position of the lens holder, and
the interconnection includes a base material and an electroconductive material, which is provided only on a subject-side surface of the base material.

* * * * *